(12) United States Patent
Park et al.

(10) Patent No.: US 11,531,355 B2
(45) Date of Patent: Dec. 20, 2022

(54) METHOD, APPARATUS, AND COMPUTER PROGRAM FOR CONTROLLING AUTONOMOUS VEHICLE USING PRESET AREA INFORMATION

(71) Applicant: RideFlux Inc., Jeju-si (KR)

(72) Inventors: Jung Hee Park, Jeju-si (KR); Ho Yun, Jeju-si (KR); Hyun Jung Cho, Jeju-si (KR); Ha Wook Jeong, Jeju-si (KR); Ji Woong Kim, Jeju-si (KR)

(73) Assignee: RideFlux Inc., Jeju-si (KR)

( * ) Notice: Subject to any disclaimer, the term of this patent is extended or adjusted under 35 U.S.C. 154(b) by 112 days.

(21) Appl. No.: 17/028,229

(22) Filed: Sep. 22, 2020

(65) Prior Publication Data

US 2021/0223790 A1 Jul. 22, 2021

(30) Foreign Application Priority Data

Jan. 21, 2020 (KR) .................. 10-2020-0007675
Feb. 11, 2020 (KR) .................. 10-2020-0016114

(51) Int. Cl.
  *G05D 1/02* (2020.01)
(52) U.S. Cl.
  CPC ......... *G05D 1/0276* (2013.01); *G05D 1/0214* (2013.01); *G05D 1/0219* (2013.01); *G05D 1/0223* (2013.01)

(58) Field of Classification Search
  CPC .. G05D 1/0276; G05D 1/0214; G05D 1/0219; G05D 1/0223; G05D 2201/0213
  See application file for complete search history.

(56) References Cited

U.S. PATENT DOCUMENTS

2020/0348669 A1\* 11/2020 Kim .................. G01C 21/20

FOREIGN PATENT DOCUMENTS

| JP | 2009-208677 A | 9/2009 |
| JP | 2019-502974 A | 1/2019 |
| JP | 2019-168965 A | 10/2019 |
| KR | 10-2014-0038180 A | 3/2014 |
| KR | 10-2016-0046440 A | 4/2016 |
| KR | 10-2019-0042097 A | 4/2019 |
| KR | 10-2019-0109712 A | 9/2019 |

\* cited by examiner

*Primary Examiner* — Rodney A Butler
(74) *Attorney, Agent, or Firm* — Sughrue Mion, PLLC

(57) ABSTRACT

There is provided a method for controlling an autonomous vehicle using preset area information, the method being performed by a computing apparatus and being a method for controlling the speed of an autonomous vehicle autonomously traveling along a preset travel path, the method including: determining whether the vehicle is located in a preset first area based on the location information of the vehicle; obtaining information about a preset second area corresponding to the first area; obtaining a condition for the second area; and determining a vehicle control command based on the condition for the second area and information collected from the second area.

10 Claims, 13 Drawing Sheets

METHOD, APPARATUS, AND COMPUTER PROGRAM FOR CONTROLLING AUTONOMOUS VEHICLE USING PRESET AREA INFORMATION

CROSS-REFERENCE TO RELATED APPLICATION

This application priority from Korean Patent Application No. 10-2020-0007675 filed on Jan. 21, 2020 and Korean Patent Application No. 10-2020-0016114 filed on Feb. 11, 2020, which are hereby incorporated by reference herein in their entirety.

BACKGROUND

1. Technical Field

Various embodiments of the present invention relate to a method, apparatus, and computer program for controlling an autonomous vehicle using preset area information.

2. Description of the Related Art

There is a trend in which for the convenience of users driving vehicles, various types of sensors and electronic devices (e.g., an advanced driver assistance system (ADAS)) are being installed. In particular, there has been actively conducted the development of technology for an autonomous driving system for a vehicle that recognizes a surrounding environment without a driver's intervention and autonomously travels to a given destination according to the recognized surrounding environment.

In this case, the term "autonomous driving system" refers to a vehicle that recognizes a surrounding environment without a driver's intervention and autonomously travels to a given destination according to the recognized surrounding environment.

A conventional autonomous driving system learns data on a road condition or a travel path, and controls a vehicle to travel to a destination using the learned data.

However, the conventional autonomous driving system is limited in performing autonomous driving by taking into account a road condition, the driver of another vehicle, a pedestrian, and a situation of a driver when setting the travel path of a vehicle through learning.

Furthermore, the conventional autonomous driving system does not take into account driving patterns customarily performed according to various situations of roads (e.g., a situation in which in the case where a vehicle turns right at an intersection and then passes through a crosswalk without a stop line, when a green signal for pedestrians is turned on the crosswalk but there is no pedestrian on the crosswalk, the vehicle travels slowly). Accordingly, the conventional autonomous driving system has a limitation in that it is impossible to obtain the same efficiency as human driving when the conventional autonomous driving system is actually applied. Therefore, a problem arises in that the conventional autonomous driving system may confuse the drivers of surrounding vehicles.

PRIOR ART DOCUMENT

Patent Document

Korean Patent Application Publication No. 10-2017-0118501 (published on Oct. 25, 2017)

SUMMARY

The present invention has been conceived to overcome the above-described problems, and an object of the present invention is to provide a method, apparatus, and computer program for controlling an autonomous vehicle using preset area information, which presets a section, in which a vehicle needs to stop or slow down according to custom or a road rule, using preset area information, and controls an autonomous vehicle according to custom even while the vehicle is passing through a section in which the possibility of occurrence of a collision or accident is determined to be zero or very low according to an algorithm for planning the travel path of the autonomous vehicle.

The objects that are achieved by the present invention are not limited to the above-described object, and other objects that have not been described above will be clearly understood by those skilled in the art from the following description.

According to an aspect of the present invention, there is provided a method for controlling an autonomous vehicle using preset area information, the method being performed by a computing apparatus and being a method for controlling the speed of an autonomous vehicle autonomously traveling along a preset travel path, the method including: determining whether the vehicle is located in a preset first area based on the location information of the vehicle; obtaining information about a preset second area corresponding to the first area; obtaining a condition for the second area; and determining a vehicle control command based on the condition for the second area and information collected from the second area.

Obtaining the condition for the second area may include, when a plurality of second areas is preset for the single first area, selecting one or more second areas from among the plurality of second areas based on the preset travel path, and obtaining conditions for the selected one or more second areas; and determining the vehicle control command may include determining the vehicle control command based on the conditions for the selected one or more second areas and information collected from the selected one or more second areas.

Determining the vehicle control command may include collecting whether an object including a vehicle and a human is present in the second area, information including the moving direction and speed of the object present in the second area, and whether the information can be collected from the second area.

Determining whether the vehicle is located in the preset first area may include determining whether the vehicle is located in a first area preset on a narrow road of a merging section and preset at a location spaced apart from a merging point, connecting the narrow road and a wide road, by a predetermined distance in the direction of the narrow road; and determining the vehicle control command may include: determining a control command to cause the speed of the vehicle to be 0 when the vehicle is located in the first area; determining whether an object is present in a second area preset on the wide road and preset at a location spaced apart from the merging point by a predetermined distance in the direction opposite to a direction passing through the merging point; and determining a control command to cause the speed of the vehicle to maintain 0 in response to the determination that the object is present in the second area, and determining a control command to cause the speed of the vehicle to be a preset speed in response to the determination that the object is not present in the second area.

Determining whether the vehicle is located in the preset first area may include determining whether the vehicle is located in a first area preset on a first traffic lane entering into an intersection and preset at a location spaced apart from an intersection point of the intersection by a predetermined distance in the direction opposite to a direction passing through the intersection point; and determining the vehicle control command may include: determining a control command to cause the speed of the vehicle to be 0 when the vehicle is located in the first area; when the preset travel path is a path that turns right at the intersection, determining whether an object is present in a second area preset on a second traffic lane along which the vehicle will travel through the intersection according to the preset travel path and preset at a location spaced apart from the intersection point by a predetermined distance in the direction opposite to a direction of the intersection point, and determining whether a value obtained by dividing a distance between the object and the vehicle by a moving speed of the object exceeds a reference time; and determining a control command to cause the speed of the vehicle to maintain 0 in response to the determination that the object is present in the second area and the value obtained by dividing the distance between the object and the vehicle by the moving speed of the object is lower than or equal to the reference time, and determining a control command to cause the speed of the vehicle to be a preset speed in response to the determination that that the object is not present in the second area or that the object is present in the second area but the value obtained by dividing the distance between the object and the vehicle by the moving speed of the object exceeds the reference time.

Determining whether the vehicle is located in the preset first area may include, when the preset travel path is a path that turns right through an intersection and passes through a crosswalk, determining whether the vehicle is located in a first area preset at a location spaced apart from the crosswalk by a predetermined distance in the direction opposite to a direction passing through the intersection point; and determining the vehicle control command may include: determining a control command to cause the speed of the vehicle to be 0 when the vehicle is located in the first area; determining whether an object is present in a second area preset at the location of the crosswalk; and determining a control command to cause the speed of the vehicle to maintain 0 in response to the determination that the object is present the second area, and determining a control command to cause the speed of the vehicle to be a preset speed in response to the determination that the object is not present the second area.

Determining whether the vehicle is located in the preset first area may include determining whether the vehicle is located in a first area preset on a first traffic lane entering into an intersection of alleys without a traffic signal and preset at a location spaced apart from the intersection point of the intersection of the alleys by a predetermined distance in the direction opposite to a direction passing through the intersection point; determining the vehicle control command may include: determining a control command to cause the speed of the vehicle to be lower than or equal to a reference speed when the vehicle is located in the first area; determining whether the information can be collected, in real time, from a plurality of second areas set on a plurality of traffic lanes that the vehicle can enter through the intersection and each preset at a location spaced apart by a predetermined distance in the direction opposite to a direction passing through the intersection point; and, when the preset travel path is a path that proceeds to one of a plurality of traffic lanes through the intersection of the alleys, determining a control command to cause the speed of the vehicle to maintain a speed lower than or equal to the reference speed in response to the determination that the information cannot be collected from at least one of the plurality of second areas preset on the remaining traffic lanes exclusive of a traffic lane along which the vehicle will travel, and determining a control command to cause the speed of the vehicle to be a preset speed in response to the determination that the information can be collected from all the plurality of second areas.

Determining whether the vehicle is located in the preset first area may include determining whether the vehicle is located in a first area preset on a first traffic lane entering into an intersection and preset at a location spaced apart from the intersection point of the intersection by a predetermined distance in the direction opposite to a direction passing through the intersection point; determining the vehicle control command may include: determining a control command to cause the speed of the vehicle to be 0 when the vehicle is located in the first area; when the preset travel path is a path that turns left at a driver's own risk at the intersection, determining whether an object is present in two second areas preset on a second traffic lane along which the vehicle will travel from the intersection according to the preset travel path and a third traffic lane opposite to the second traffic lane and each preset at a location spaced apart from the intersection point by a predetermined distance in the direction opposite to a direction passing through the intersection point, and determining whether a value obtained by dividing a distance between the object and the vehicle by the moving speed of the object exceeds a reference time; and determining a control command to cause the speed of the vehicle to maintain 0 in response to the determination that the object is present in any one of the two second areas and the value obtained by dividing the distance between the object and the vehicle by the moving speed of the object is lower than or equal to the reference time, and determining a control command to cause the speed of the vehicle to be a preset speed in response to the determination that the object is not present in the two second areas or that the object is present in any one of the two second areas but the value obtained by dividing the distance between the object and the vehicle by the moving speed of the object exceeds the reference time.

Determining the vehicle control command may include, when the second area is not set for the first area, determining a control command to cause the speed of the vehicle to be lower than a reference speed or a control command to cause the speed of the vehicle to be 0 in response to the determination that the vehicle is located in the first area.

According to another aspect of the present invention, there is provided an apparatus including: memory configured to store one or more instructions; and a processor configured to execute the one or more instructions stored in the memory; wherein the processor performs a method for controlling an autonomous vehicle using preset area information according to an embodiment of the present invention by executing the one or more instructions.

According to still another aspect of the present invention, there is provided a computer program stored in a computer-readable storage medium to perform a method for controlling an autonomous vehicle using preset area information according to an embodiment of the present invention in combination with a computer, which is hardware.

Other specific details of the present invention are included in the following detailed description and the accompanying drawings.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
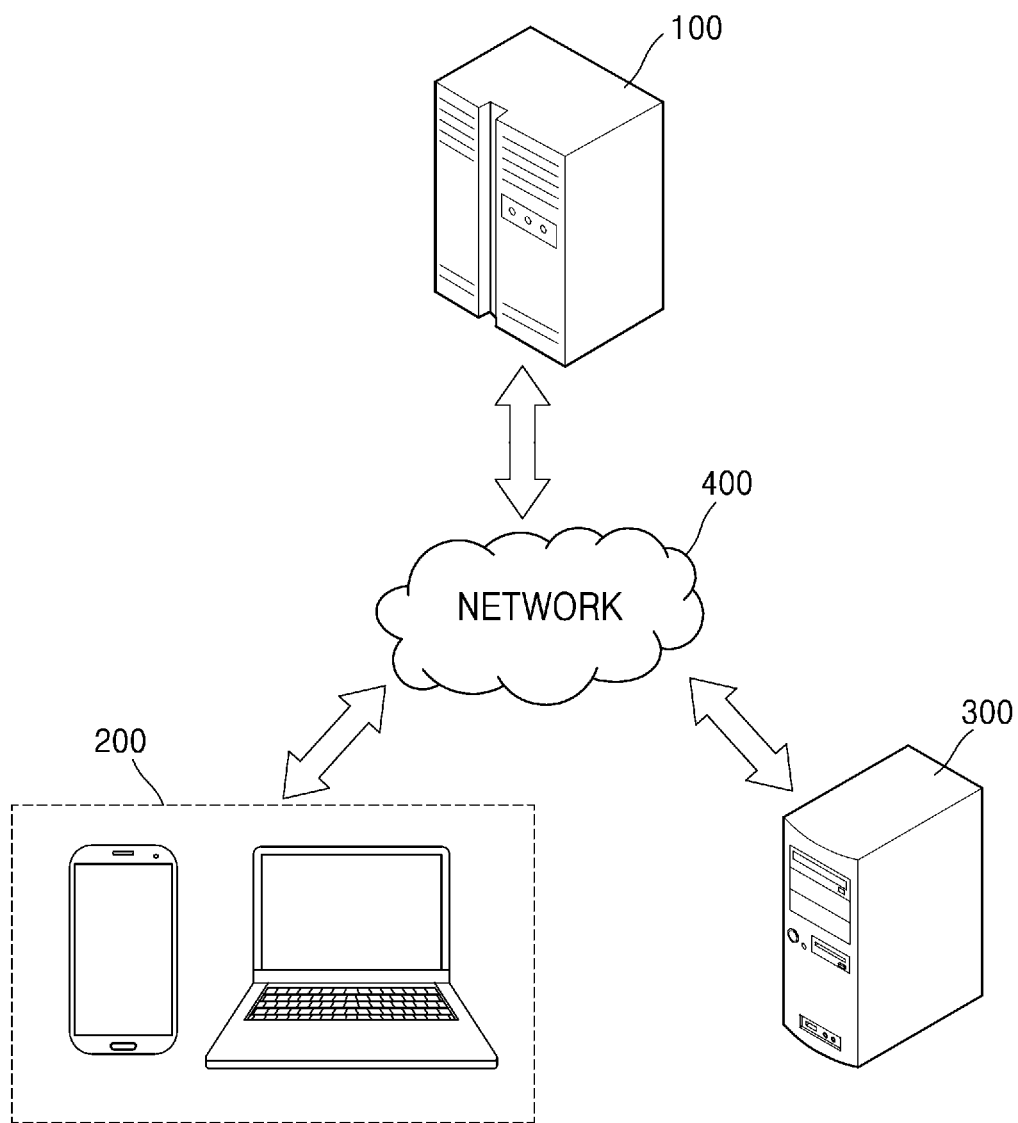
FIG. 1 is a diagram showing the configuration of a system for controlling an autonomous vehicle using preset area information according to an embodiment of the present invention.

The advantages and features of the present invention, and methods for achieving them will become apparent by referring to embodiments that will be described in detail below in conjunction with the accompanying drawings. However, the present invention is not limited to the embodiments disclosed below, but may be implemented in various different forms. The present embodiments are provided merely to make the disclosure of the present invention complete and to fully convey the scope of the present invention to those having ordinary skill in the art to which the present invention pertains. The present invention is defined only by the scope of the claims.

The terms used herein are intended to describe the embodiments but are not intended to limit the present invention. In the present specification and the attached claims, a singular form also includes a plural form unless otherwise specified in a corresponding passage. As used herein, "include (comprise)" and/or "including (comprising)" do not exclude the presence or addition of one or more components other than the components mentioned. Throughout the specification, the same reference numerals designate the same components, and the term "and/or" includes each of the components mentioned and every combination of one or more of the components mentioned. Although the terms "first," "second," etc. are used to describe various components, it will be apparent that these components are not limited by these terms. These terms are only used to distinguish one component from other components. Accordingly, it will be apparent that a first component mentioned below may be a second component within the technical spirit of the present invention.

Unless otherwise defined, each of all the terms (including technical and scientific terms) used herein may be used in a sense that can be commonly understood by those having ordinary skill in the art to which the present invention pertains. Furthermore, the terms defined in the commonly used dictionaries are not ideally or excessively interpreted unless explicitly defined.

The term "unit" or "module" used herein means a software component, or a hardware component such as a field programmable gate array (FPGA) or an application specific integrated circuit (ASIC), that performs a specific task. A unit or module may advantageously be configured to reside in an addressable storage medium and configured to execute on one or more processors. Accordingly, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functions provided in the components, units, or modules may be combined into a smaller number of components, units, or modules, or may be further separated into additional components, units, or modules.

Spatially relative terms, such as "below," "beneath," "lower," "above," "upper," and the like, may be used herein for ease of description to describe the relationship of one component or feature to another component(s) or feature(s) as shown in the drawings. It will be understood that the spatially relative terms are intended to encompass different orientations of a component in use or operation in addition to the orientation depicted in the drawings. For example, when a component shown in the drawings is turned over, components described as being "below" or "beneath" other components or features would then be oriented "above" the other components or features. Accordingly, the exemplary term "below" or "beneath" may encompass both an orientation of above, and below or beneath. A component may be otherwise oriented, in which case the spatially relative terms used herein may be interpreted accordingly.

In the present specification and the attached claims, the computer refers to all types of hardware devices including at least one processor. In one embodiment, the computer may be understood as having a meaning encompassing a software configuration operating in a corresponding hardware device. For example, the computer may be understood as having a meaning including, but not limited to, a smartphone, a tablet PC, a desktop, a laptop, and a user client and applications running on each of the devices.

Embodiments of the present invention will be described in detail below with reference to the accompanying drawings.

Although each step described herein is described as being performed by a computer, the agent of each step is not limited thereto. In an embodiment, at least some of individual steps may be performed in different devices.

Furthermore, although the autonomous driving method of an autonomous vehicle described in this specification is described based on a scheme in which a travel path to a destination is set in advance and the autonomous vehicle travels autonomously according to the set travel path, the autonomous driving method is not limited thereto. In an embodiment, the present invention may be applied to an autonomous driving scheme in which the situation of a road, along which an autonomous vehicle is traveling, is analyzed in real time and a travel path is set in real time.

Furthermore, although a method for controlling an autonomous vehicle using preset area information, which is described in the present specification, is described based on a vehicle that is equipped with an autonomous driving function and travels according to the autonomous driving function, the method for controlling an autonomous vehicle using preset area information is not limited thereto. However, the method for controlling an autonomous vehicle using preset area information may be applied to a vehicle that does not use an autonomous driving function or does not have an autonomous driving function. For example, a connection may be made to a general vehicle in terms of communication, and the control of the vehicle may be guided according to a vehicle control command determined according to the method for controlling an autonomous vehicle using preset area information (e.g., guidance is output onto the display of an infotainment system within a vehicle in a guide message form, or is output in a voice form). However, the present invention is not limited thereto.

FIG. 1 is a diagram showing the configuration of a system for controlling an autonomous vehicle using preset area information according to an embodiment of the present invention.

Referring to FIG. 1, the system for controlling an autonomous vehicle using preset area information according to the present embodiment may include an apparatus 100 for controlling an autonomous vehicle, a user terminal 200, and an external server 300.

In this case, the system for controlling an autonomous vehicle using preset area information, which is shown in FIG. 1, is provided according to one embodiment. The components of the system for controlling an autonomous vehicle using preset area information are not limited to the embodiment shown in FIG. 1. As needed, new components may be added, or the former components may be changed or deleted.

In one embodiment, the apparatus 100 for controlling an autonomous vehicle may be connected to the user terminal 200 and the external server 300 over a network 400. The apparatus 100 for controlling an autonomous vehicle may transmit various types of information related to a vehicle control command to the user terminal 200 and the external server 300 over the network 400, or may receive various types of information (e.g., information about a first area, information about a second area, and information about a condition) related to the determination of a vehicle control command from the user terminal 200 and the external server 300.

In one embodiment, the apparatus 100 for controlling an autonomous vehicle may determine a control command to control a vehicle (e.g., an autonomous vehicle) to travel autonomously. For example, the apparatus 100 for controlling an autonomous vehicle may be connected to a vehicle control module (not shown) provided inside a vehicle over the network 400, and may control the vehicle by transmitting a control command indicative of the steering and speed control of the vehicle to the vehicle control module so that the vehicle can travel along a travel path preset for the vehicle. However, the present invention is not limited thereto.

In one embodiment, the apparatus 100 for controlling an autonomous vehicle may determine a control command to control the vehicle so that the vehicle travels according to custom based on preset area information. For example, when a vehicle travels a path that turns right at an intersection and passes through a crosswalk, the apparatus 100 for controlling an autonomous vehicle may control the vehicle so that the vehicle temporarily stops in front of the crosswalk using the preset area information and then moves when there is no pedestrian walking along the crosswalk or a pedestrian signal changes to a red signal.

In this case, the preset area information may refer to a first area in which a vehicle needs to stop or slow down according to custom or a road rule and a second area in which analysis is required to determine whether to keep a vehicle stopping or slowing down or to change to a normal travel state.

In various embodiments, the first and second areas may be preset and stored in the process of manufacturing an autonomous driving service that is provided by the apparatus 100 for controlling an autonomous vehicle. For example, the first and second areas may be set for the apparatus 100 for controlling an autonomous vehicle in advance in the process of generating map data including the paths of the autonomous vehicle (e.g., a method in which a manufacturer directly sets the areas).

In one embodiment, the user terminal 200 may be connected to the apparatus 100 for controlling an autonomous vehicle over the network 400 over a wired/wireless connection, and may control the vehicle according to a control command provided from the apparatus 100 for controlling an autonomous vehicle. For example, the user terminal 200 may be provided in the vehicle, and may include a vehicle control module configured to control the vehicle.

In various embodiments, the user terminal 200 may include a display device in at least a portion of the user terminal 200, and may output vehicle various types of user interfaces (UIs) (e.g., a UI configured to output a guide message adapted to guide a user thorough a vehicle control command determined using the preset area information, etc.) provided from the apparatus 100 for controlling an autonomous. For example, the user terminal 200 may include a smartphone, a tablet personal computer (PC), a notebook, a desktop, and a vehicular infotainment system. However, the present invention is not limited thereto.

In one embodiment, the external server 300 may store various types of data required by the apparatus 100 for controlling an autonomous vehicle to determine a vehicle control command. For example, the external server 300 may store information related to the first area, information related to a plurality of travel paths, information related to the second area corresponding to the first area, and information related to a condition for the second area.

In various embodiments, the external server 300 may store information related to the first area, information related to travel paths passing through the first area, information related to the second area corresponding to the travel paths, and information related to a condition for the second area in association with one another. For example, the external server 300 may store information related to the first area, information related to travel paths passing through the first area, information related to the second area corresponding to the travel paths, and information related to a condition for the second area in association with map data. The external server 300 may also load information related to a plurality of first areas located on a travel path, information related to a plurality of second areas corresponding to the plurality of first areas, and information related to conditions in the process of loading a travel path from map data according to a destination of the vehicle, and may provide the loaded information to the apparatus 100 for controlling an autonomous vehicle.

In this case, although the system for controlling an autonomous vehicle using preset area information, which is shown in FIG. 1, is disclosed in a form in which various types of data required to determine a vehicle control command are stored in the external server 300 according to one embodiment, the present invention is not limited thereto. Alternative, the apparatus 100 for controlling an autonomous vehicle may include a separate storage device (not shown) therein, and may store various types of data required to determine a vehicle control command in the storage device. The hardware configuration of the apparatus 100 for controlling an autonomous vehicle will be described below with reference to FIG. 2.

Figure 2:
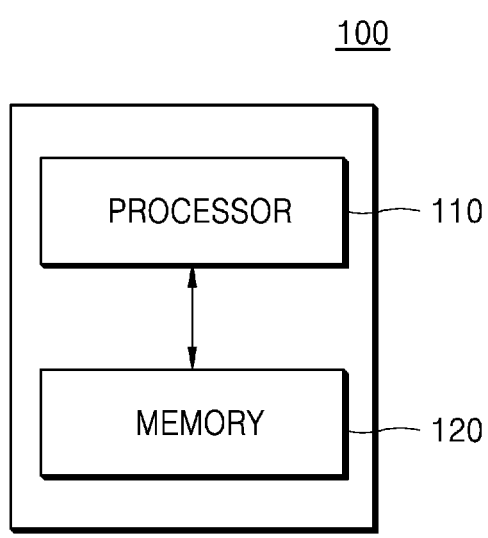
FIG. 2 is a diagram showing the hardware configuration of an apparatus for controlling an autonomous vehicle using preset area information according to another embodiment of the present invention.

FIG. 2 is a diagram showing the hardware configuration of an apparatus for controlling an autonomous vehicle using preset area information according to another embodiment of the present invention.

Referring to FIG. 2, the apparatus 100 for controlling an autonomous vehicle (hereinafter referred to as the "computing apparatus 100") according to the present embodiment may include a processor 110 and memory 120. In various embodiments, the computing apparatus 100 may further include a network interface (or a communication interface) (not shown), storage (not shown), and a bus (not shown).

In one embodiment, the processor 110 may control the overall operation of each component of the computing apparatus 100. The processor 110 may include a central processing unit (CPU), a micro-processor unit (MPU), a micro-controller unit (MCU), and any type of processor well known in the art to which the present invention pertains.

In various embodiments, the processor 110 may perform operations for at least one application or program for the performance of methods according to embodiments of the present invention. In various embodiments, the processor 110 may include one or more cores (not shown), and a graphic processing unit (not shown), and/or a connection path (e.g., a bus or the like) configured to transmit and receive signals to and from another component.

In various embodiments, the processor 110 may further include random access memory (RAM) (not shown) and read-only memory (ROM) (not shown) configured to temporarily and/or permanently store signals (or data) processed inside the processor 110. Furthermore, the processor 110 may be implemented in the form of a system on chip (SoC) including a graphics processing unit and at least one of RAM and ROM.

In one embodiment, the processor 110 may execute one or more instructions stored in the memory 120, thereby performing a method (a method for controlling an autonomous vehicle using preset area information) to be described in conjunction with FIGS. 3 to 10B. For example, the processor 110 may execute one or more instructions stored in the memory 120, thereby performing a method for controlling an autonomous vehicle using preset area information, the method including: determining whether the vehicle is located in a preset first area based on the location information of the vehicle; obtaining information about a preset second area corresponding to the first area; obtaining a condition for the second area; and determining a vehicle control command based on the condition for the second area and information collected from the second area.

In one embodiment, the memory 120 may store various types of data, commands, and/or information. The memory 120 may store programs (one or more instructions) for the processing and control of the processor 110. The programs stored in the memory 120 may be divided into a plurality of modules according to their function.

In various embodiments, steps of a method or algorithm descried in conjunction with an embodiment of the present invention may be directly implemented by hardware, by a software module executed by hardware, or by a combination thereof. The software module may reside in random access memory (RAM), read-only memory (ROM), erasable programmable ROM (EPROM), electrically erasable programmable ROM (EEPROM), flash memory, a hard disk, a removable disk, CD-ROM, or a computer-readable storage medium well known to the art to which the present invention pertains.

The components of the present invention may be implemented as a program (or an application) to be executed in combination with a computer, i.e., hardware, and may be stored in a medium. The components of the invention may be implemented in the form of software programming or software components. Similarly, embodiments may include various algorithms implemented by combinations of data structures, processes, routines and/or other programming components, and may be implemented in programming or scripting languages such as C, C++, Java, assembler, etc. Functional aspects may be implemented as algorithms running on one or more processors. A method for controlling an autonomous vehicle using preset area information, which is performed by the computing apparatus 100, will be described below with reference to FIGS. 3 to 10B.

Figure 3:
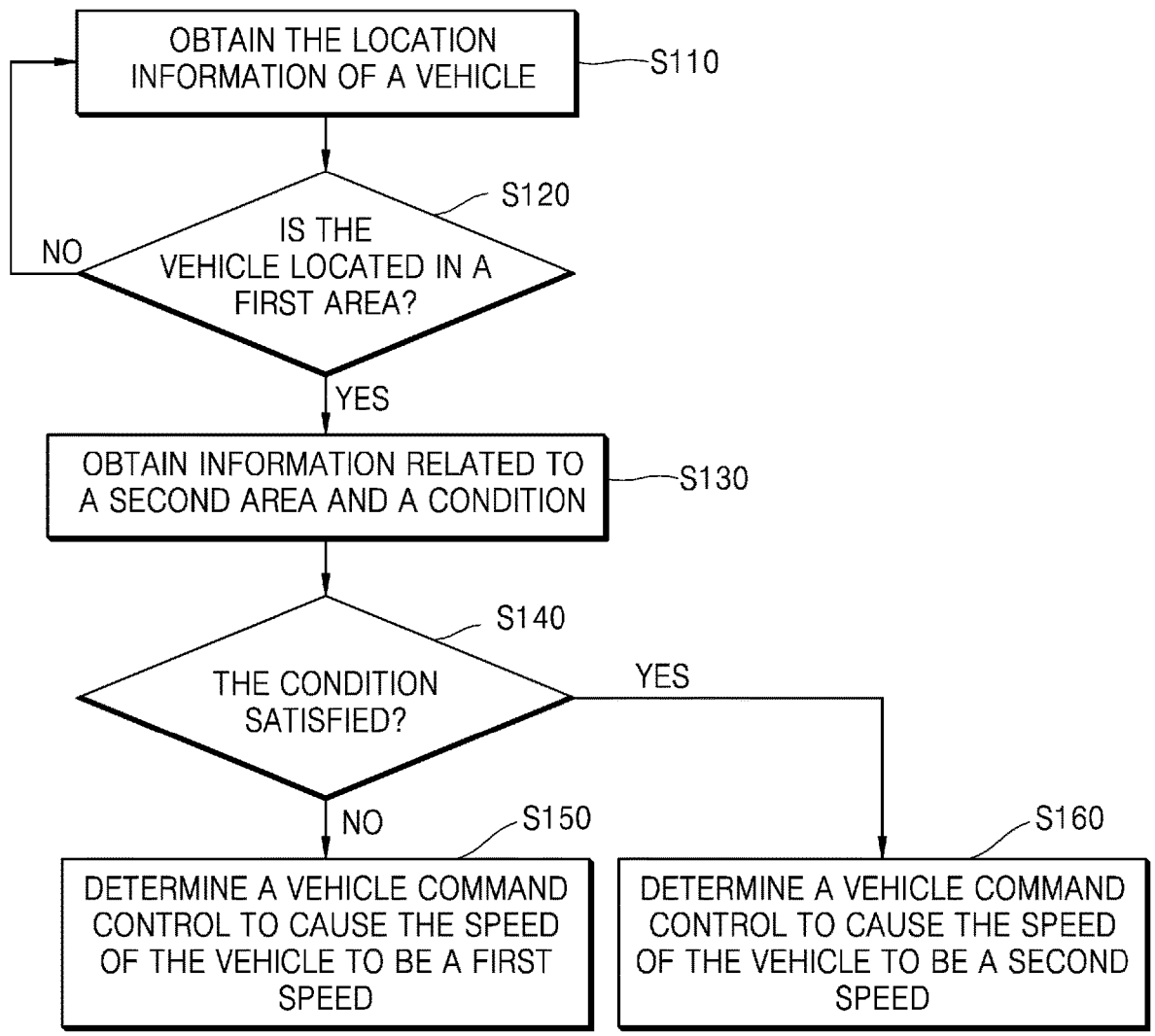
FIGS. 3 and 4 are flowcharts showing a method for controlling an autonomous vehicle using preset area information according to still another embodiment of the present invention.
Figure 4:
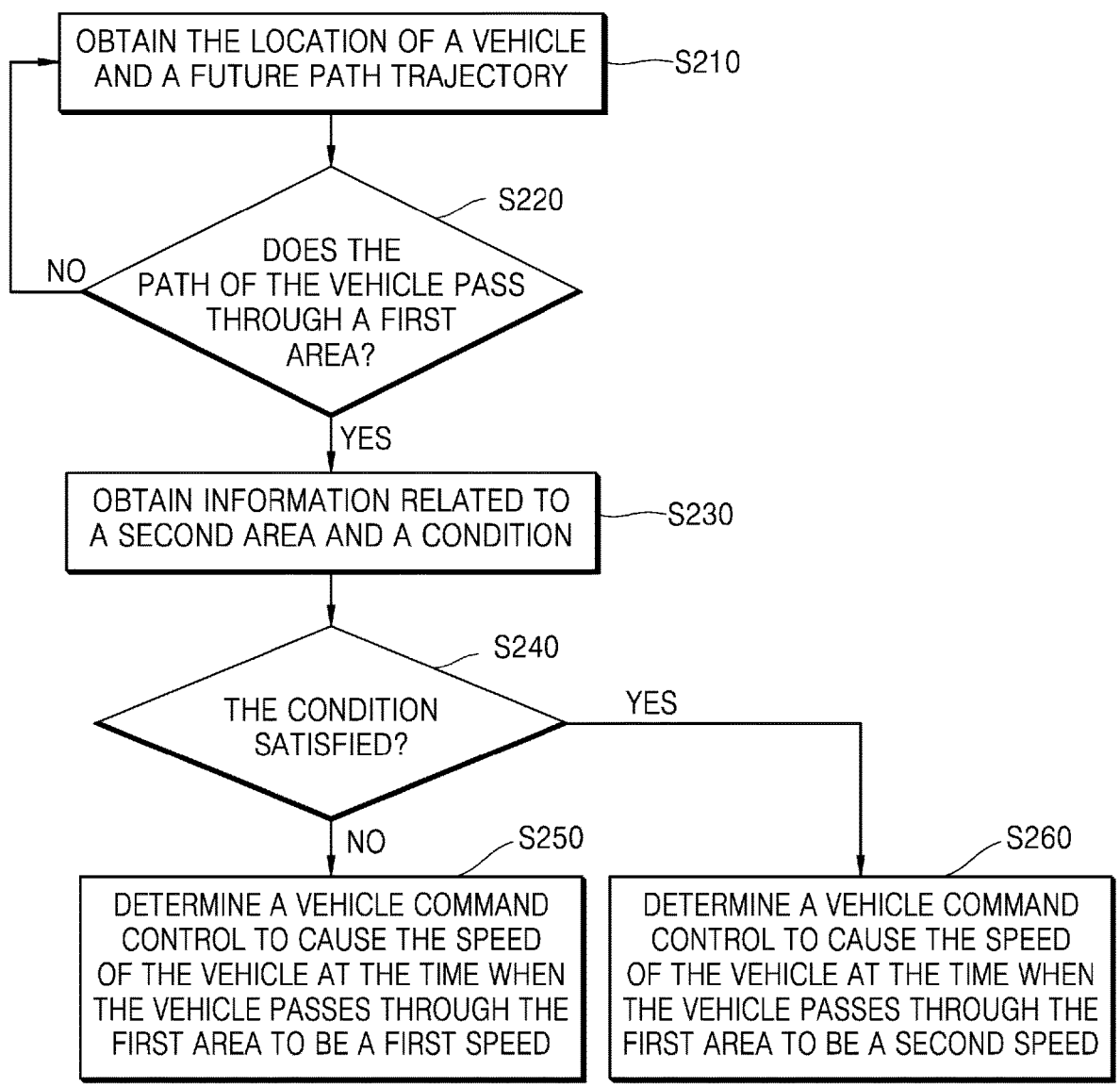

FIGS. 3 and 4 are flowcharts showing a method for controlling an autonomous vehicle using preset area information according to still another embodiment of the present invention.

First, referring to FIG. 3, the computing apparatus 100 may control the current speed of a vehicle based on whether the current location of the vehicle is located in a first region and whether a condition for a second region is satisfied.

At step S110, the computing apparatus 100 may obtain location information from a vehicle (e.g., an autonomous vehicle). For example, the computing apparatus 100 may obtain the location information of the vehicle from a location sensor (e.g., a Global Positioning System (GPS) sensor) provided in the vehicle.

In various embodiments, the computing apparatus 100 may be connected to the user terminal 200 in the vehicle, and may obtain the location information of the vehicle from a location sensor provided in the user terminal 200. However, the present invention is not limited thereto.

At step S120, the computing apparatus 100 may determine whether the vehicle is located in the first area based on the location information of the vehicle obtained at step S110. For example, the computing apparatus 100 may determine whether the vehicle is located in the first area based on whether the coordinates of the location information of the vehicle are included in the coordinates of the first area preset on map data based on the location information of the vehicle. However, the present invention is not limited thereto.

In this case, the first area may be set based on a set location or an operation of a vehicle controlled at the corresponding location (e.g., a stop operation and a slow operation). For example, the first region may be set in various shapes such as a polygonal shape, a point set shape, a linear shape, and a circular shape.

In various embodiments, the computing apparatus 100 may set the size of the first area to a size equal to or smaller than that of the vehicle when an area in question is an area in which the vehicle needs to perform a stop operation, and may set the size of the first area to a size larger than that of the vehicle when an area in question is an area in which the vehicle needs to perform a slow operation. However, the present invention is not limited thereto.

When it is determined at step S120 that the vehicle is located in the first area, the computing apparatus 100 obtains information related to the second area corresponding to the first area in which the vehicle is located and information related to a condition for the second area at step S130.

In various embodiments, the computing apparatus 100 may determine that the vehicle is located in the first region when the vehicle is located in at least a portion of the preset first region. In various embodiments, the computing apparatus 100 may determine that the vehicle is located in the first region only when the vehicle is completely located within the preset first region. However, the present invention is not limited thereto.

In various embodiments, the computing apparatus 100 may obtain information related to the first area, the second area and a condition from the external server 300 (or a storage device separately provided in the computing apparatus 100). For example, the computing apparatus 100 may select a second area stored in association with the first area in which a vehicle is located from among a plurality of preset second areas, and may obtain information related to the selected second area and information related to a condition for the second area.

In this case, the information related to the second area may refer to information that can be collected from the preset second area. For example, the information related to the second area may include information about whether an object such as a vehicle or a human is present in the second area and the moving direction and speed of an object in the case where the object is present in the second area. Furthermore, the information related to the second area may further include information about whether the above-described information can be collected from the preset second area.

Furthermore, in this case, the information related to the condition for the second area refers to a criterion for determining whether to maintain the vehicle in a stopped or slow state or to change to a normal travel state based on the information related to the second area. For example, the information related to the condition for the second area may include whether an object is present in the second area and whether a value obtained by dividing the distance between the object and the vehicle by the moving speed of the object exceeds a reference time. However, the present invention is not limited thereto.

In various embodiments, when a plurality of second areas is preset for a single first area, the computing apparatus 100 may select at least one second area from among the plurality of second areas based on a preset travel path, and may obtain a condition for the selected at least one second region.

In various embodiments, when it is determined at step S120 that the vehicle is not located in the first area, the computing apparatus 100 may repeat step S110 until it is determined that the vehicle is located in the first area.

At step S140, the computing apparatus 100 may determine whether the condition is satisfied based on the information related to the second region and the information related to the condition for the second region obtained at step S130. For example, the computing apparatus 100 may determine that the condition is satisfied when an object is not present in the second area or when an object is present in the second area but a value obtained by dividing the distance between the object and the vehicle by the moving speed of the object exceeds a reference time based on the information related to the second area at step S130. In contrast, the computing apparatus 100 may determine that the condition is not satisfied when an object is present in the second area or when a value obtained by dividing the distance between the object and the vehicle in the second area by the moving speed of the object does not exceed the reference time. However, the present invention is not limited thereto.

When it is determined at step S140 that the condition is not satisfied, the computing apparatus 100 may determine a control command to cause the speed of the vehicle to be a first speed at step S150. For example, when an object is present in the second area or when a value obtained by dividing the distance between the object and the vehicle in the second area by the moving speed of the object does not exceed the reference time, the computing apparatus 100 may determine a control command to control the speed of the vehicle to be 0 (a stopped state) or a control command to control the speed of the vehicle to be less than a reference speed (a slow state).

When it is determined at step S140 that the condition is satisfied, the computing apparatus 100 may determine a control command to cause the speed of the vehicle to be a second speed at step S160. For example, when an object is not present in the second area or when an object is present in the second area but a value obtained by dividing the distance between the object and the vehicle by the moving speed of the object exceeds the reference time, the computing apparatus 100 may determine a control command to control the speed of the vehicle to be a set normal travel speed (e.g., 50 to 60 km/h based on a downtown area) according to a preset autonomous driving scenario.

In various embodiments, the computing apparatus 100 may provide a control command determination UI to the user terminal 200. When a user input is obtained via the control command determination UI, the speed of the vehicle may be controlled according to the user input regardless of the determination of whether the condition is satisfied at step S140. For example, the computing apparatus 100 may provide a control command determination UI to the user terminal 200 (e.g., a terminal of a driver of the vehicle), and the driver may be guided through the determination of whether the condition is satisfied at step S140 via the control command determination.

Thereafter, the computing apparatus 100 may receive a control command to control the speed of the vehicle to be a first or second speed in response to whether the condition is satisfied from the user terminal 200, and may control the speed of the vehicle to be a first or second speed based on the user input.

In contrast, when there is no separate user input for whether the condition is satisfied from the user terminal 200, the computing apparatus 100 determines the speed of the vehicle to be the first or second speed based on the determination of whether the condition is satisfied at step S140. However, the present invention is not limited thereto.

Next, referring to FIG. 4, the computing apparatus 100 may control the future speed of the vehicle (when the vehicle passes through the first area) based on whether the future location of the vehicle is located in the first region and whether the condition for the second region is satisfied according to the path trajectory of the vehicle.

At step S210, the computing apparatus 100 may obtain the current location information of the vehicle and path trajectory information. For example, the computing apparatus 100 may obtain the current location information of the vehicle from a location sensor provided in the vehicle, and may obtain the path trajectory information based on the current location of the vehicle from the external server 300 configured to store the travel path preset for the vehicle (e.g., step S110 of FIG. 3). However, the present invention is not limited thereto.

At step S220, the computing apparatus 100 may determine whether the vehicle will pass through the preset first area based on the current location and path trajectory of the vehicle obtained at step S210. For example, the computing apparatus 100 may determine whether the vehicle will pass through the preset first region based on whether the vehicle passes through the coordinates of the first region preset on map data based on the path trajectory of the vehicle. However, the present invention is not limited thereto. In this case, the preset first area may be the same as described at step S120, but is not limited thereto.

When it is determined at step S220 that the vehicle will pass through the preset first area, the computing apparatus 100 may obtain information related to a second area corresponding to the first area through which the vehicle will pass and information related to a condition for the second area at step S230 (e.g., step S130 of FIG. 3).

At step S240, the computing apparatus 100 may determine whether a condition is satisfied based on the information related to the second area and the information related to the condition for the second area obtained at step S230 (e.g., step S140 of FIG. 3).

When it is determined at step S240 that the condition is satisfied, the computing apparatus 100 may determine a control command to cause the future speed of the vehicle at the time when the vehicle passes through the first area to be the first speed at step S250.

When it is determined at step S240 that the condition is satisfied, the computing apparatus 100 may determine a control command to cause the future speed of the vehicle at the time when the vehicle passes through the first area to be the second speed at step S260.

In various embodiments, the computing apparatus 100 may provide a control command determination UI to the user terminal 200, and, when obtaining a user input via the control command determination UI, may control the speed of the vehicle according to the user input regardless of the determination of whether the condition is satisfied at step S240. However, the present invention is not limited thereto.

The above-described method for controlling an autonomous vehicle using preset area information has been described with reference to the flowchart shown in the drawing. For brevity of description, the method for controlling an autonomous vehicle using preset area information has been shown and described as a series of blocks. However, the present invention is not limited to the sequence of the blocks, and some blocks may be performed in a sequence different from that shown and described therein or may be performed simultaneously. Furthermore, new blocks not described or shown in the specification or drawings may be added, or some blocks may be deleted or changed. A configuration in which the computing apparatus 100 determines control commands for an autonomous vehicle in various situations will be described below with reference to FIGS. 5 to 11.

Figure 5:
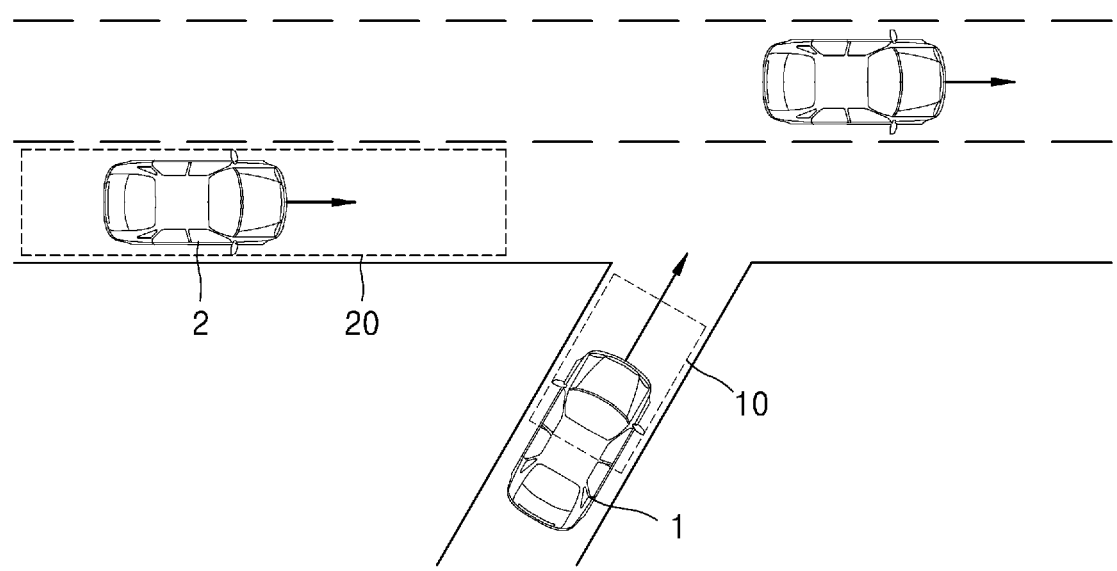
FIG. 5 is a diagram showing a configuration of controlling an autonomous vehicle in a merging section in various embodiments.

FIG. 5 is a diagram showing a configuration of controlling an autonomous vehicle in a merging section in various embodiments.

Referring to FIG. 5, in various embodiments, when a vehicle 1 enters a wide road from a narrow road of a merging section, the computing apparatus 100 may determine whether the vehicle 1 is located in a first area 10 preset on a narrow road of the merging section.

In various embodiments, the first area 10 may be a preset area at a location spaced apart from a merging point, connecting a narrow road and a wide road, by a predetermined distance in the direction of the narrow road. However, the present invention is not limited thereto.

Thereafter, when it is determined that the vehicle 1 is located in the first area 10 preset on the narrow road, the computing apparatus 100 may determine a control command to control the speed of the vehicle 1, located in the first area 10, to be 0 (e.g., a control command to control entry into a stopped state).

Thereafter, the computing apparatus 100 may obtain information related to a second area 20 corresponding to the first area 10 preset on the narrow road and information related to a condition for the second area 20.

In various embodiments, the second area 20 may be preset on the wide road and be preset at a location spaced apart from the merging point by a predetermined distance in the direction opposite to a direction passing through the merging point, as shown in FIG. 5. Furthermore, the condition for the second area 20 may be whether an object 2 (e.g., a vehicle) is present in the second area 20. However, the present invention is not limited thereto.

Thereafter, the computing apparatus 100 may determine a control command to control the vehicle 1 based on whether the condition for the second area 20 is satisfied. For example, the computing apparatus 100 may determine a control command to control the speed of the vehicle 1 to maintain 0 (a stopped state) in response to the determination that the object 2 is present in the second area 20 on the wide road. In contrast, the computing apparatus 100 may determine a control command to control the speed of the vehicle 1 to be a preset speed in response to the determination that the object 2 is not present in the second area 20 on the wide road.

Figure 6:
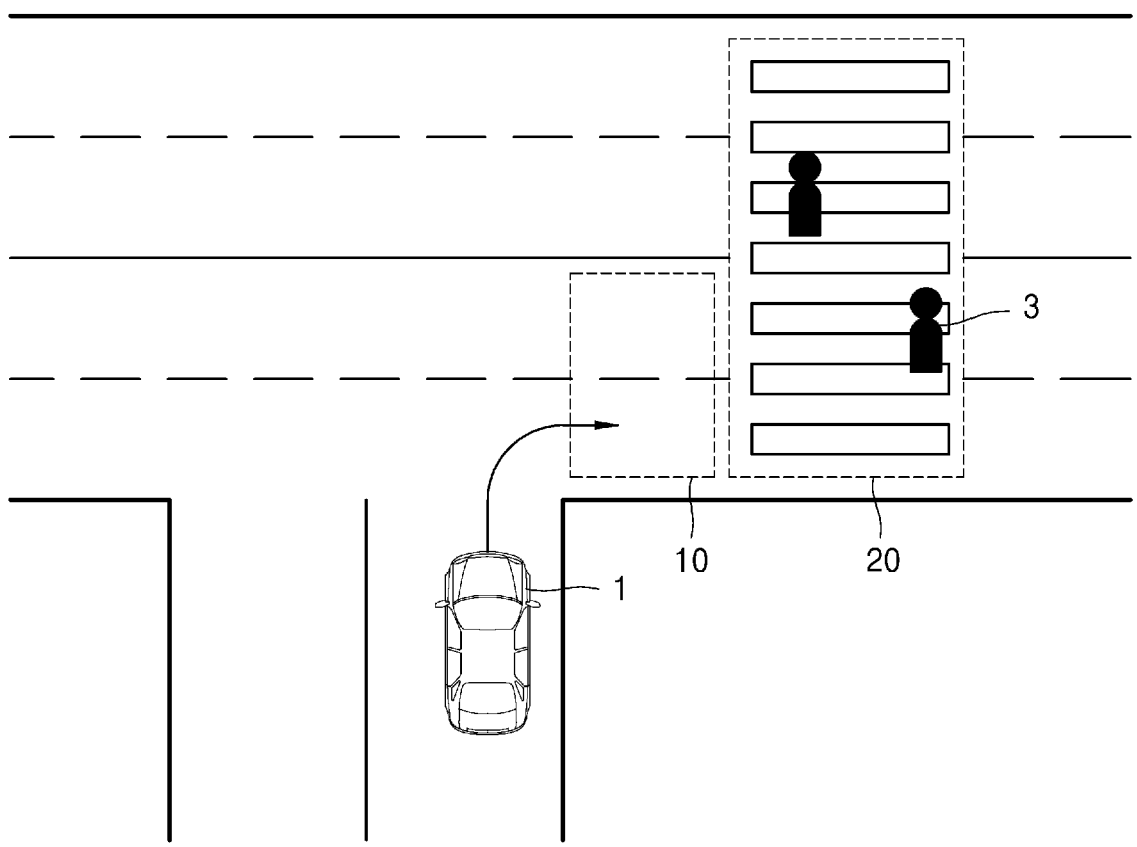
FIG. 6 is a diagram showing a configuration of controlling an autonomous vehicle that turns right at an intersection beside which a crosswalk is present in various embodiments.

FIG. 6 is a diagram showing a configuration of controlling an autonomous vehicle that turns right at an intersection beside which a crosswalk is present in various embodiments.

Referring to FIG. 6, in various embodiments, when the vehicle 1 turns right at an intersection and then passes through a crosswalk, the computing apparatus 100 may determine whether the vehicle 1 is located in a preset first area 10 in front of the crosswalk.

In various embodiments, the first area 10 may be an area preset at a location spaced apart from the crosswalk by a predetermined distance in the direction opposite to a direction passing through the intersection point. However, the present invention is not limited thereto.

Thereafter, when it is determined that the vehicle 1 is located in the first area 10 at a location adjacent to the crosswalk, the computing apparatus 100 may determine a control command to control the speed of the vehicle 1, located in the first area 10, to be 0 (e.g., a control command to control entry into a stopped state).

Thereafter, the computing apparatus 100 may obtain information related to a second area 20 corresponding to the first area 10 at the location adjacent to the crosswalk and information related to a condition for the second area 20.

In various embodiments, the second area 20 may be preset at the location of the crosswalk, as shown in FIG. 6. Furthermore, the condition for the second area 20 may be whether an object 3 (e.g., a human) is present in the second area 20. However, the present invention is not limited thereto.

Thereafter, the computing apparatus 100 may determine a control command to control the vehicle 1 based on whether the condition for the second area 20 is satisfied. For example, the computing apparatus 100 may determine a control command to control the speed of the vehicle 1 to maintain 0 (a stopped state) in response to the determination that the object 3 is present in the second area 20. In contrast, the computing apparatus 100 may determine a control command to control the speed of the vehicle 1 to be a preset speed in response to the determination that the object 3 is not present in the second area 20.

Figure 7:
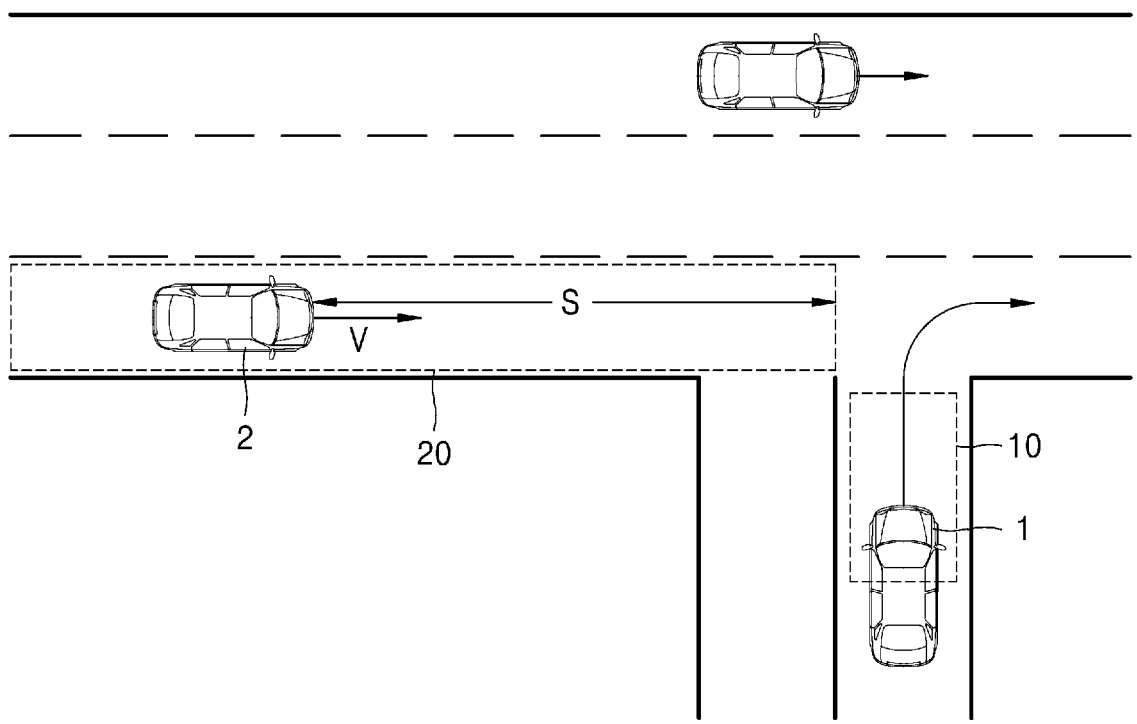
FIG. 7 is a diagram showing a configuration of controlling an autonomous vehicle that turns right at an intersection beside which a crosswalk is not present in various embodiments.

FIG. 7 is a diagram showing a configuration of controlling an autonomous vehicle that turns right at an intersection beside which a crosswalk is not present in various embodiments.

Referring to FIG. 7, in various embodiments, when the vehicle 1 turns right at an intersection beside which there is no crosswalk, the computing apparatus 100 may determine whether the vehicle 1 is located in a first area preset on a first traffic lane 10 merging into an intersection (e.g., a traffic lane along which the vehicle 1 is currently traveling).

In various embodiments, the first area 10 may be preset on the first traffic lane, and may be preset at a location spaced apart from the intersection point of the intersection by a predetermined distance in the direction opposite to a direction passing through the intersection point (e.g., the direction opposite to the direction in which the vehicle 1 is traveling). However, the present invention is not limited thereto.

Thereafter, when it is determined that the vehicle 1 is located in the first area 10 on the first traffic lane, the computing apparatus 100 may determine a control command to control the speed of the vehicle 1, located in the first area 10, to be 0 (e.g., a control command to control entry into a stopped state).

Thereafter, the computing apparatus 100 may obtain information related to a second area 20 corresponding to the first area 10 on the first traffic lane and information related to a condition for the second area 20.

In various embodiments, the second area 20 may be preset on a second traffic lane along which the vehicle 1 travels from the intersection, and may be preset at a location spaced apart from the intersection point by a predetermined distance in the direction opposite to a direction passing through the intersection point, as shown in FIG. 7. Furthermore, the condition for the second area 20 may be whether an object 2 (e.g., a vehicle) is present in the second area 20 and whether a value obtained by dividing a distance S between the object 2 and the vehicle 1 by the moving speed V of the object 2 exceeds a reference time. However, the present invention is not limited thereto.

Thereafter, the computing apparatus 100 may determine a control command to control the vehicle 1 based on whether the condition for the second area 20 is satisfied. For example, the computing apparatus 100 may determine a control command to control the speed of the vehicle 1 to maintain 0 (a stopped state) in response to the determination that the object 2 is present in the second area 20 and the value obtained by dividing the distance S between the object 2 and the vehicle 1 by the moving speed V of the object 2 is lower than or equal to the reference time. In contrast, the computing apparatus 100 may determine a control command to control the speed of the vehicle 1 to be a preset speed in response to the determination that the object 3 is not present in the second area 20 and the value obtained by dividing the distance S between the object 2 and the vehicle 1 by the moving speed V of the object 2 exceeds the reference time.

Figure 8A:
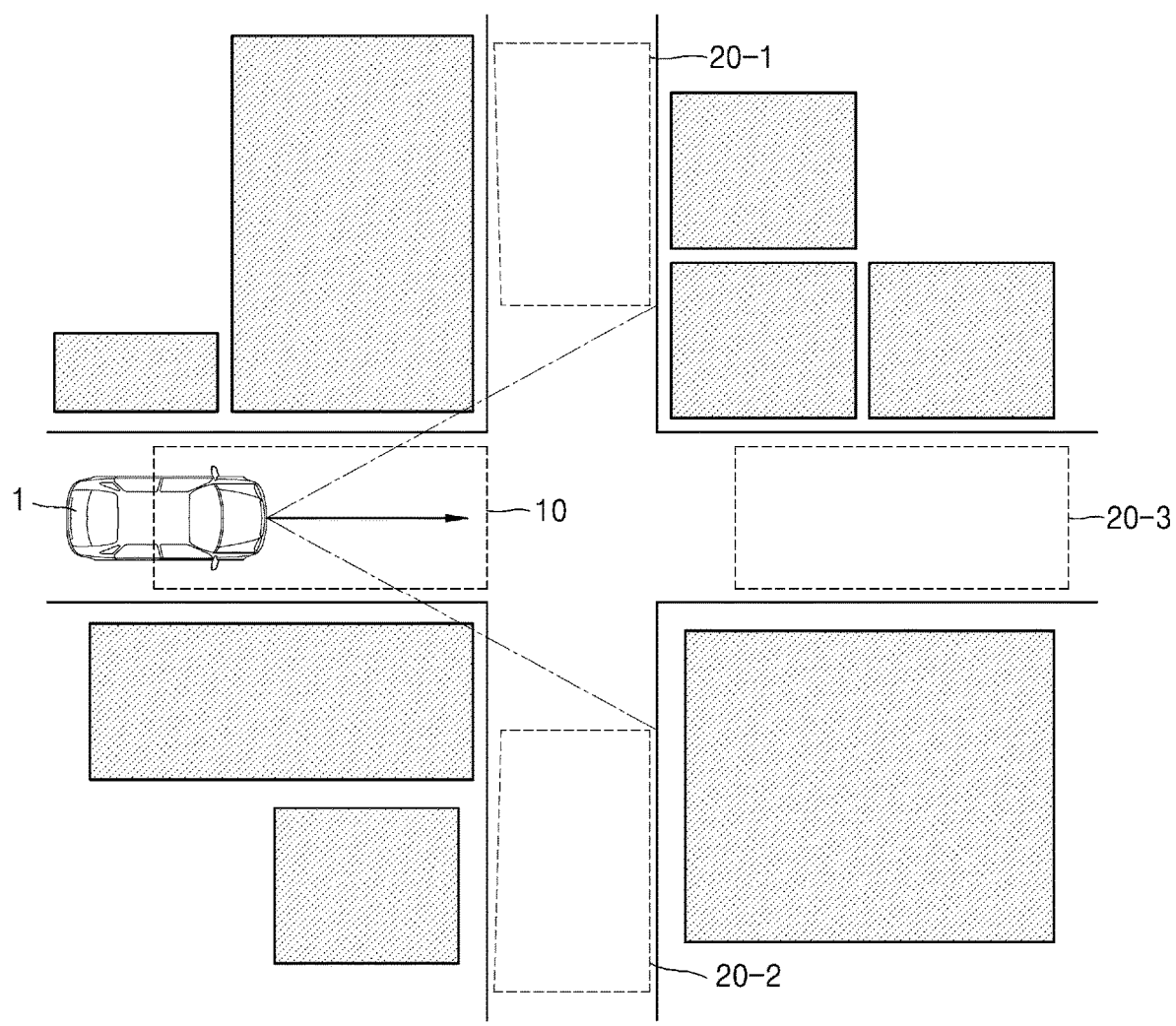
FIGS. 8A and 8B are diagrams showing a configuration of controlling an autonomous vehicle that passes through an intersection of alleys without a traffic signal in various embodiments.
Figure 8B:
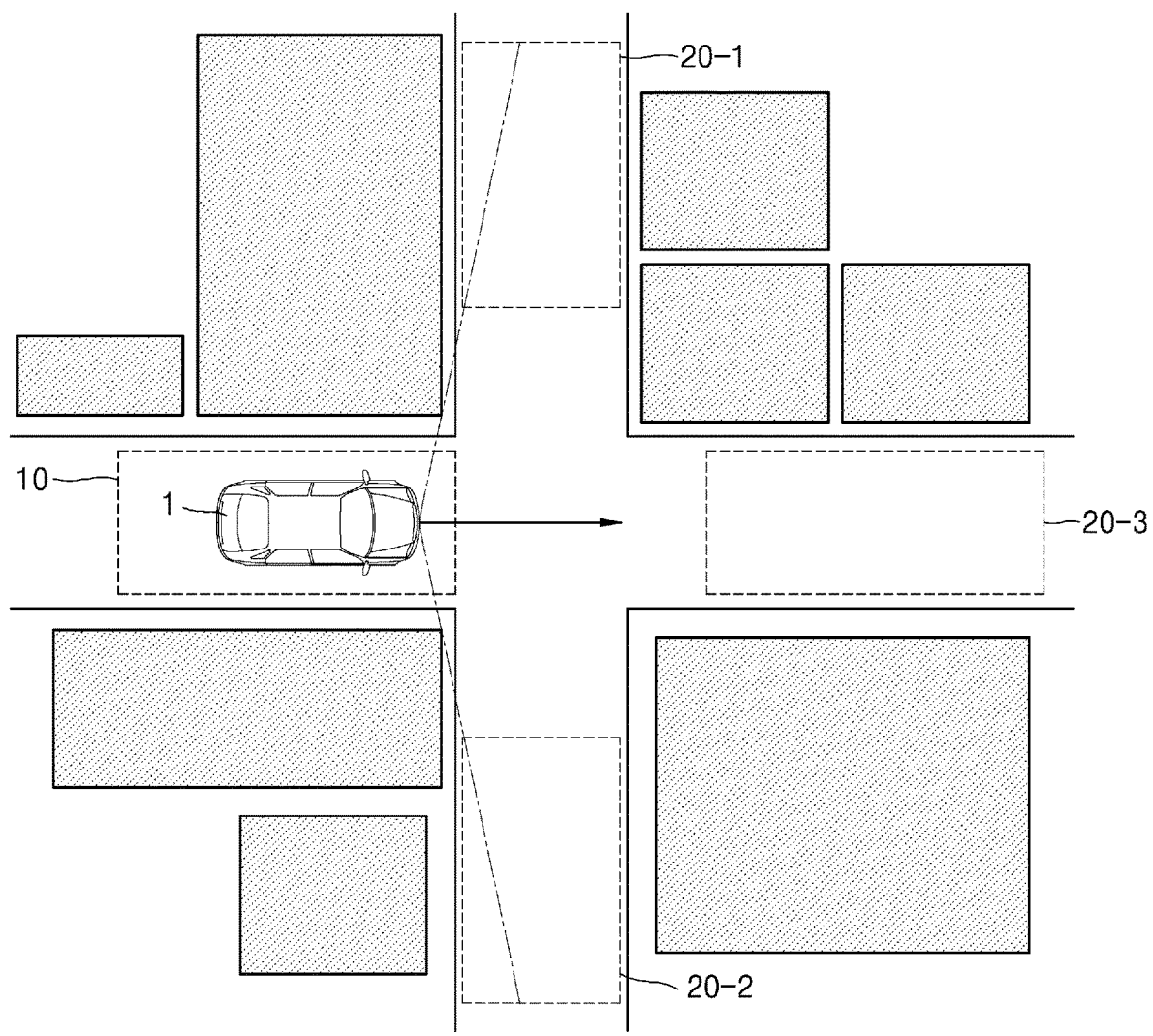

FIGS. 8A and 8B are diagrams showing a configuration of controlling an autonomous vehicle that passes through an intersection of alleys without a traffic signal in various embodiments.

Referring to FIGS. 8A and 8B, in various embodiments, when the vehicle 1 enters a first traffic lane of the intersection of alleys without a traffic signal and then proceeds to any one of a plurality of traffic lanes branching off from the intersection, the computing apparatus 100 may determine whether the vehicle 1 is located in a first area 10 preset on the first traffic lane merging into the intersection (e.g., a traffic lane along which the vehicle 1 is currently traveling).

In various embodiments, the first area 10 may be preset on the first traffic lane and may refer to an area preset at a location spaced apart from the intersection point of the intersection of the alleys by a predetermined distance in the direction opposite to a direction passing through the intersection point (e.g., the direction opposite to the direction along which the vehicle travels). However, the present invention is not limited thereto.

Thereafter, when it is determined that the vehicle 1 is located in the first area 10 on the first traffic lane, the computing apparatus 100 may determine a control command to control the speed of the vehicle 1, located in the first area 10, to be lower than a reference speed (e.g., a control command to control entry into a low-speed travel state).

Thereafter, the computing apparatus 100 may obtain information related to second areas 20-1, 20-2 and 20-3 corresponding to a first area 10 on the first traffic lane and information related to conditions for the second areas 20-1, 20-2 and 20-3.

In various embodiments, the second areas 20-1, 20-2 and 20-3 are preset on the plurality of traffic lanes to which the vehicle 1 can proceed through the intersection, and may be each set at a location spaced apart from the intersection point by a predetermined distance in the direction opposite to a direction passing through the intersection point. Furthermore, the conditions for the second areas 20-1, 20-2 and 20-3 may be whether information can be collected from the second areas 20-1, 20-2 and 20-3 in real time. However, the present invention is not limited thereto.

In various embodiments, when the second areas 20-1, 20-2 and 20-3 corresponding to the first area 10 on the first traffic lane are plural in number, as shown in FIGS. 8A and 8B, the computing apparatus 100 may select one or more second areas from among the plurality of second areas 20-1, 20-2 and 20-3 based on a preset travel path, and may obtain information and conditions related to the selected second areas. For example, when the preset travel path is a path to which the vehicle 1 traveling along the first traffic lane proceeds through the intersection of alleys, the computing apparatus 100 may select the second areas 20-1 and 20-2 preset on the remaining traffic lanes exclusive of the second area 20-3 preset on the traffic lane along with the vehicle 1 will travel, and may obtain information related to the selected second areas 20-1 and 20-2-4 and information related to conditions for the respective select second areas 20-1 and 20-2.

In various embodiments, the computing apparatus 100 may receive a safe driving class from a user, and may select one or more second areas from among the plurality of second areas 20-1, 20-2 and 20-3 based on the input safe driving class. For example, when the safe driving class input from a user is a normal class, the computing apparatus 100 may select the second areas 20-1 and 20-2 preset on the remaining traffic lanes exclusive of the second area 20-3 preset on the traffic lane along which the vehicle 1 will travel. Furthermore, when the safe driving class input from a user is a safe class, the computing apparatus 100 may select all the second areas 20-1, 20-2 and 20-3. However, the present invention is not limited thereto.

Thereafter, the computing apparatus 100 may determine a control command to control the vehicle 1 based on whether the conditions for the second areas 20 are satisfied. For example, the computing apparatus 100 may determine a control command to control the speed of the vehicle 1 to maintain a speed lower than the reference speed in response to the determination that information cannot be collected from the selected second areas 20-1 and 20-2, as shown in FIG. 8A. In contrast, the computing apparatus 100 may determine a control command to control the speed of the vehicle 1 to be a preset speed in response to the determination that information can be collected from the selected second areas 20-1 and 20-2, as shown in FIG. 8B.

In various embodiments, when it is determined that information can be collected from the selected second areas 20-1 and 20-2 and it is also determined based on information collected from the selected second areas 20-1 and 20-2 that an object is present in at least one of the selected second areas 20-1 and 20-2, the computing apparatus 100 may determine a control command to control the speed of the vehicle 1 to maintain a speed lower than the reference speed or to be 0.

In various embodiments, the computing apparatus 100 may determine the conditions for the second areas are satisfied only when, in the case where the second areas corresponding to the first area are plural in number, all the conditions for the second areas are satisfied. However, the present invention is not limited thereto.

Figure 9:
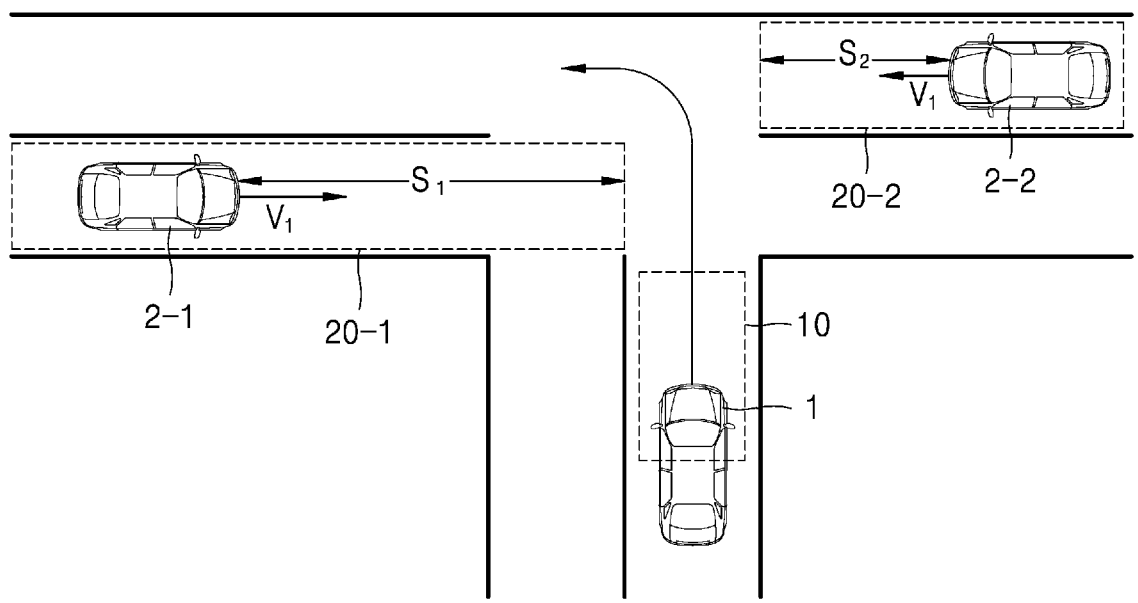
FIG. 9 is a diagram showing a configuration of controlling an autonomous vehicle that turns left at a driver's own risk in various embodiments.

FIG. 9 is a diagram showing a configuration of controlling an autonomous vehicle that turns left at a driver's own risk in various embodiments.

Referring to FIG. 9, in various embodiments, when a vehicle 1 turns left at a driver's own risk at an intersection without a crosswalk, the computing apparatus 100 may determine whether the vehicle 1 is located in a first area 10 on a first traffic lane merging into the intersection (e.g., a traffic lane along which the vehicle 1 is currently traveling).

In various embodiments, the first area 10 may be preset on the first traffic lane, and may be an area preset at a location spaced apart from the intersection point of an intersection by a predetermined distance in the direction opposite to a direction passing through the intersection point (e.g., the direction opposite to the direction in which the vehicle 1 is traveling). However, the present invention is not limited thereto.

Thereafter, when it is determined that the vehicle 1 is located in the first area 10 preset on the first traffic lane, the computing apparatus 100 may determine a control command to control the speed of the vehicle 1, located in the first area 10, to be 0 (e.g., a control command to control entry into a stopped state).

Thereafter, the computing apparatus 100 may obtain information related to the second areas 20-1 and 20-2 corresponding to the first area 10 on the first traffic lane and information related to conditions for the second areas 20-1 and 20-2.

In various embodiments, the second areas 20-1 and 20-2 may be preset on a second traffic lane along which the vehicle 1 will travel through the intersection and a third traffic lane opposite to the second traffic lane and may be each preset at a location spaced apart from the intersection point by a predetermined distance in the direction opposite to a direction passing through the intersection point, as shown in FIG. 9. Furthermore, the condition for each of the second areas 20-1 and 20-2 may be whether an object 2-1 or 2-2 (e.g., a vehicle) is present in the second area 20-1 or 20-2 and whether a value obtained by dividing the distance S1 or S2 between the object 2-1 or 2-2 and the vehicle 1 by the moving speed V1 or V2 of the object 2 exceeds a reference time. However, the present invention is not limited thereto.

Thereafter, the computing apparatus 100 may determine a control command to control the vehicle 1 based on whether the conditions for the second areas 20-1 and 20-2 are satisfied.

For example, the computing apparatus 100 may determine a control command to control the speed of the vehicle to maintain 0 (a stopped state) in response to the determination that the object 2-1 or 2-2 is present in any one of the second areas 20-1 and 20-2 and a value (e.g., S1/V1 or S2/V2) obtained by dividing the distance S1 or S2 between the object 2-1 or 2-2 and the vehicle 1 by the moving speed V1 or V2 of the object 2-1 or 2-2 is equal to or lower than the reference time. In contrast, the computing apparatus 100 may determine a control command to control the speed of the vehicle to be a preset speed in response to the determination that the object 2-1 or 2-2 is not present in any one of the second areas 20-1 and 20-2 or that the object 2-1 or 2-2 is present in any one of the second areas 20-1 and 20-2 but a value (e.g., S1/V1 or S2/V2) obtained by dividing the distance S1 or S2 between the object 2-1 or 2-2 and the vehicle 1 by the moving speed V1 or V2 of the object 2-1 or 2-2 exceeds the reference time.

Figure 10A:
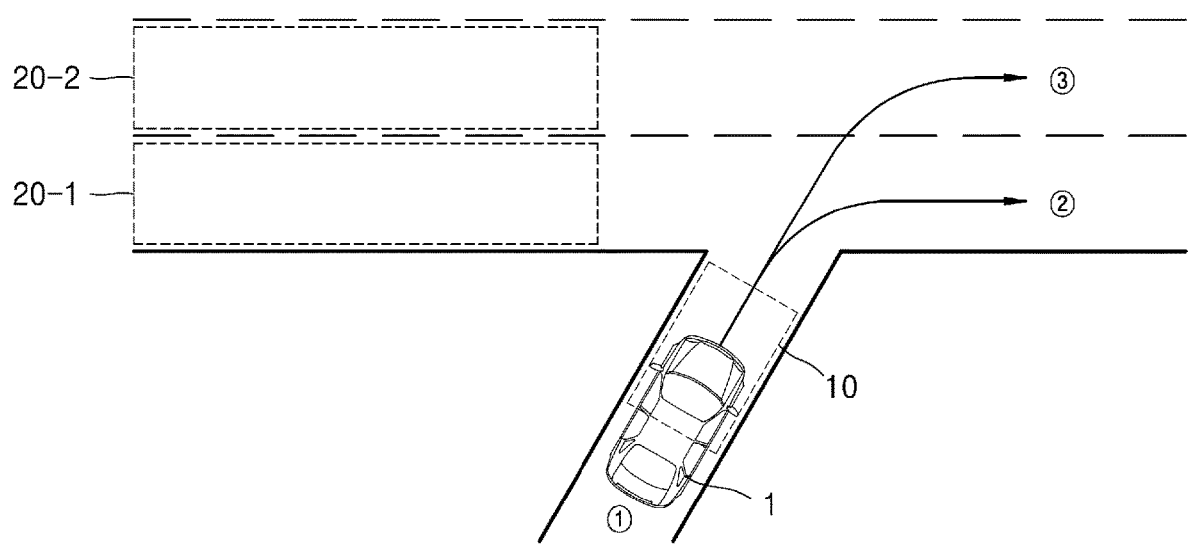
FIGS. 10A and 10B are diagrams showing a configuration of selecting one or more second areas from among a plurality of second areas corresponding to a single first area according to the travel path of a vehicle in various embodiments.
Figure 10B:
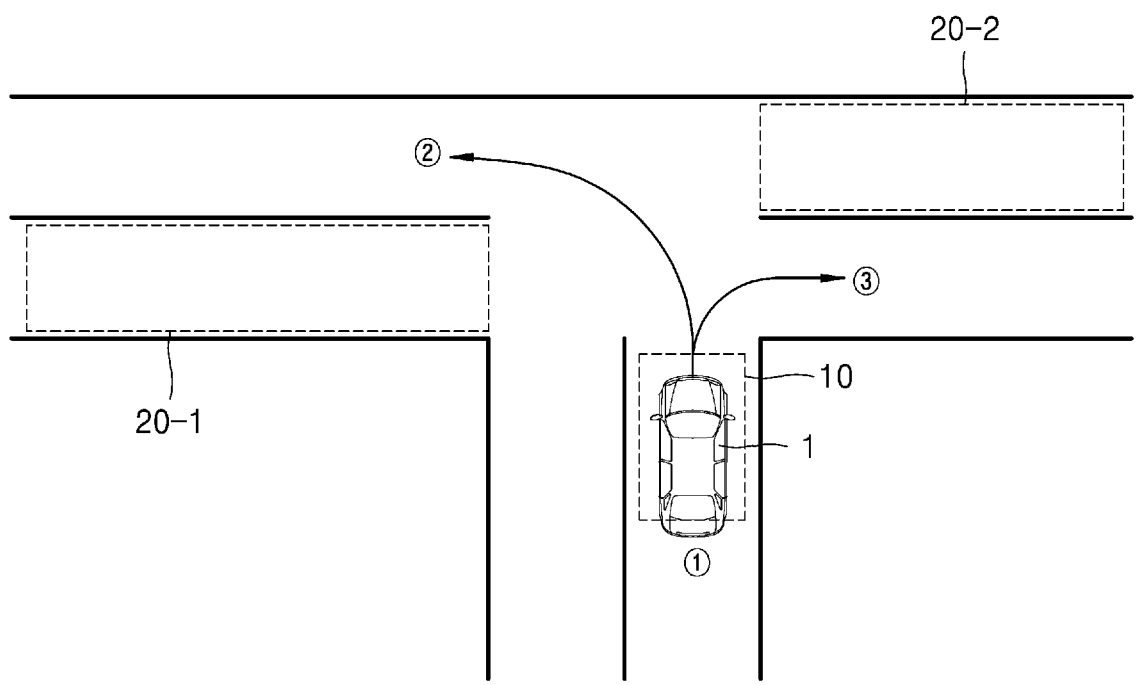

FIGS. 10A and 10B are diagrams showing a configuration of selecting one or more second areas from among a plurality of second areas corresponding to a single first area according to the travel path of a vehicle in various embodiments.

In various embodiments, when the plurality of second areas are preset for the single first area, the computing apparatus 100 may select one or more second areas from among the plurality of second areas based on the preset travel path, and may determine whether conditions for the selected one or more second areas are satisfied.

In general, in an area in which a vehicle can travel along various travel paths such as an intersection, an area to which attention will be paid varies depending on a travel path, and thus a plurality of second areas may be set for a plurality of travel paths, respectively. In this case, when the computing apparatus 100 determines whether all conditions for the plurality of second areas corresponding to the first area are satisfied, a problem arises in that an operation control to allow a vehicle to travel may not be performed even in the case where traveling is possible in order to satisfy an unnecessary condition. For example, when the vehicle turns right at the intersection, the second area set on the traffic lane opposite to the traffic lane along which the vehicle will travel after a right turn does not need to be considered for an actual right turn. However, when whether the conditions for all the second areas are satisfied is determined, whether a condition for the area that does not need to be considered for an actual right turn is satisfied may be determined.

In order to mitigate this problem, the computing apparatus 100 selectively determines whether a condition for only an area to be considered is satisfied based on the preset travel path of the vehicle without considering all the plurality of second areas corresponding to the first area, thereby obtaining results more rapidly and accurately by reducing the computational load to be processed.

First, referring to FIG. 10A, in various embodiments, when the travel path of a vehicle 1 is a path that passes through a narrow road of a merging section and merges into a wide road and the vehicle 1 is located in the first area 10 located on the narrow road (or the vehicle 1 is predicted to be located in the first area 10 located on the narrow road), the computing apparatus 100 may determine whether conditions for the second areas corresponding to the first area 10 preset on the narrow road in the merging section are satisfied, in which case at least one second area may be selected from among the plurality of second areas 20-1 and 20-1 corresponding to the first area 10 according to the travel path of the vehicle and whether a condition for the selected second area is satisfied may be determined. For example, when the vehicle 1 travels from a narrow road ① to the first traffic lane ② of a wide road, the computing apparatus 100 determines whether a condition for the second area 20-1 belonging to a plurality of second areas 20-1 and 20-2 corresponding to the first area 10 and set on the first traffic lane ② is satisfied.

In contrast, when the vehicle 1 travels from the narrow road ① to the second traffic lane ③ of the wide road, the computing apparatus 100 may determine whether a condition for the second area 20-1 set on the first traffic lane ② and a condition for the second area 20-2 set on the second traffic lane ③ are satisfied.

Next, referring to FIG. 10B, in various embodiments, when the vehicle 1 passes through an intersection and turns left or right and a vehicle 1 is located in a first area 10 located at the intersection (or the vehicle 1 is predicted to be located in the first area 10 located at the intersection), the computing apparatus 100 may determine whether conditions for one or more second areas corresponding to the first area 10 located at the intersection are satisfied, in which case at least one of a plurality of second areas 20-1 and 20-1 corresponding to the first area 10 may be selected based on the travel path (e.g., a left turn or a right turn) of the vehicle and whether a condition for the selected second area is satisfied is determined. For example, when the travel path of the vehicle 1 is a path that enters the intersection through a traffic lane ① along which the vehicle 1 is currently traveling, turns left at a driver's risk, and then proceeds along a first traffic lane ②, the computing apparatus 100 may determine whether a condition for the second area 20-2 set on the second traffic lane ② along which the vehicle 1 will travel through the intersection and a condition for the second area 20-1 set on a second traffic lane ③, which is a traffic lane opposite to the first traffic lane ②, are satisfied.

In contrast, when the travel path of the vehicle 1 is a path that enters the intersection along the traffic lane ① along which the vehicle 1 is currently traveling, turns right and then proceeds along the second traffic lane ③, the computing apparatus 100 may determine only whether a condition for the second area 20-1 belonging to the plurality of second areas 20-1 and 20-2 corresponding to the first area 10 and set on the second traffic lane ③ is satisfied. However, the present invention is not limited thereto.

In various embodiments, when a second area is not set for the first area (e.g., only the first area is set in a specific place), the computing apparatus 100 may determine a control command to cause the speed of the vehicle to be lower than a reference speed or a control command to cause the speed of the vehicle to be 0 in response to the determination that the vehicle is located in the first area. This will be described in detail below with reference to FIG. 11.

Figure 11:
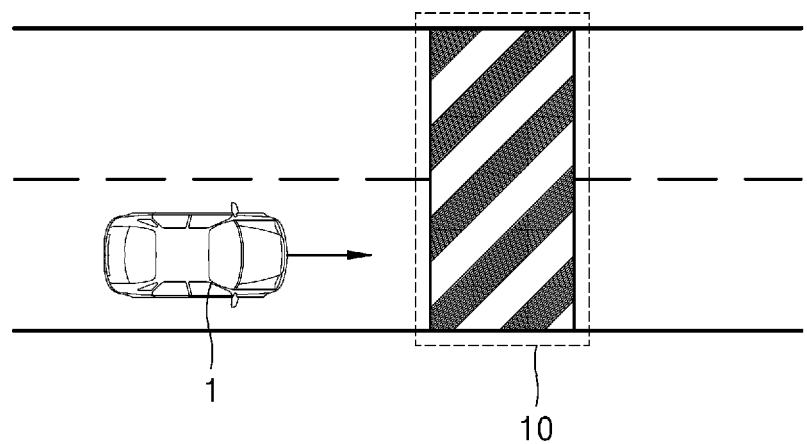
FIG. 11 is a diagram showing a configuration of controlling an autonomous vehicle when a second area is not set in various embodiments.

FIG. 11 is a diagram showing a configuration of controlling an autonomous vehicle when a second area is not set in various embodiments.

Referring to FIG. 11, the computing apparatus 100 may preset only a first area 10 without setting a second area for a section in which a speed needs to be adjusted regardless of the situations of a road (e.g., whether objects such as a vehicle and a human are present, a moving direction, and a moving speed), such as a section including a speed bump or stop sign that is provided on a road.

Thereafter, when a vehicle 1 passes through a speed bump, the computing apparatus 100 may determine whether the vehicle 1 is located in a first area 10 preset on the speed bump, and may determine a control command to control the speed of the vehicle 1 to be lower than a reference speed in response to the determination that the vehicle 1 is located in the first area 10 preset on the speed bump. Furthermore, the computing apparatus 100 may determine whether the vehicle is located in a first area preset in the vicinity of a stop sign, and may determine a control command to control the speed of the vehicle to be 0 in response to the determination that the vehicle is located in the first area preset in the vicinity of the stop sign. However, the present invention is not limited thereto.

According to various embodiments of the present invention, there are provided the method, apparatus, and computer program for controlling an autonomous vehicle using preset area information, which preset a section, in which a vehicle needs to stop or slow down according to custom or a road rule, using preset area information, and control an autonomous vehicle according to custom even while the vehicle passes through a section in which the possibility of occurrence of a collision or accident is determined to be zero or very low according to an algorithm for planning the travel path of the autonomous vehicle, thereby preventing the drivers of nearby vehicles from suffering from confusion due to the autonomous vehicle.

The effects of the present invention are not limited to the above-described effects, and other effects that have not been described above will be clearly understood by those skilled in the art from the foregoing description.

While the embodiments of the present invention have been described above with reference to the accompanying drawings, it will be understood that those having ordinary skill in the art to which the present invention pertains may implement the present invention in other specific forms without changing its technical spirit or essential features. Therefore, it should be understood that the above-described embodiments are illustrative but not restrictive in all respects.

What is claimed is:

1. A method for controlling an autonomous vehicle using preset area information, the method being performed by a computing apparatus and being a method for controlling the speed of an autonomous vehicle autonomously traveling along a preset travel path, the method comprising:
    determining, by the computing apparatus, whether the vehicle is located in a preset first area based on location information of the vehicle;
    obtaining, by the computing apparatus, information about a preset second area corresponding to the first area;
    obtaining, by the computing apparatus, a condition for the second area; and determining, by the computing apparatus, a vehicle control command based on the condition for the second area and information collected from the second area, wherein obtaining the condition for the second area comprises:

when a plurality of second areas is preset for the single first area, selecting, by the computing apparatus, one or more second areas from among the plurality of second areas based on the preset travel path, and obtaining, by the computing apparatus, conditions for the selected one or more second areas; and determining the vehicle control command comprises determining, by the computing apparatus, the vehicle control command based on the conditions for the selected one or more second areas and information collected from the selected one or more second areas.

2. The method of claim 1, wherein determining the vehicle control command comprises collecting, by the computing apparatus, whether an object including a vehicle and a human is present in the second area, information including a moving direction and speed of the object present in the second area, and whether the information can be collected from the second area.

3. The method of claim 1, wherein:

determining whether the vehicle is located in the preset first area comprises determining, by the computing apparatus, whether the vehicle is located in a first area preset on a narrow road of a merging section and preset at a location spaced apart from a merging point, connecting the narrow road and a wide road, by a predetermined distance in a direction of the narrow road; and determining the vehicle control command comprises:

determining, by the computing apparatus, a control command to cause a speed of the vehicle to be 0 when the vehicle is located in the first area;

determining, by the computing apparatus, whether an object is present in a second area preset on the wide road and preset at a location spaced apart from the merging point by a predetermined distance in a direction opposite to a direction passing through the merging point; and determining, by the computing apparatus, a control command to cause a speed of the vehicle to maintain 0 in response to a determination that the object is present in the second area, and determining, by the computing apparatus, a control command to cause a speed of the vehicle to be a preset speed in response to a determination that the object is not present in the second area.

4. The method of claim 1, wherein:

determining whether the vehicle is located in the preset first area comprises determining, by the computing apparatus, whether the vehicle is located in a first area preset on a first traffic lane entering into an intersection and preset at a location spaced apart from an intersection point of the intersection by a predetermined distance in a direction opposite to a direction passing through the intersection point; and determining the vehicle control command comprises:

determining, by the computing apparatus, a control command to cause a speed of the vehicle to be 0 when the vehicle is located in the first area;

when the preset travel path is a path that turns right at the intersection, determining by the computing apparatus, whether an object is present in a second area preset on a second traffic lane along which the vehicle will travel through the intersection according to the preset travel path and preset at a location spaced apart from the intersection point by a predetermined distance in a direction opposite to a direction of the intersection point, and determining, by the computing apparatus, whether a value obtained by dividing a distance between the object and the vehicle by a moving speed of the object exceeds a reference time; and determining, by the computing apparatus, a control command to cause a speed of the vehicle to maintain 0 in response to a determination that the object is present in the second area and the value obtained by dividing the distance between the object and the vehicle by a moving speed of the object is lower than or equal to the reference time, and determining, by the computing apparatus, a control command to cause a speed of the vehicle to be a preset speed in response to a determination that that the object is not present in the second area or that the object is present in the second area but the value obtained by dividing the distance between the object and the vehicle by the moving speed of the object exceeds the reference time.

5. The method of claim 1, wherein:

determining whether the vehicle is located in the preset first area comprises, when the preset travel path is a path that turns right through an intersection and passes through a crosswalk, determining, by the computing apparatus, whether the vehicle is located in a first area preset at a location spaced apart from the crosswalk by a predetermined distance in a direction opposite to a direction passing through the intersection point; and determining the vehicle control command comprises:

determining, by the computing apparatus, a control command to cause a speed of the vehicle to be 0 when the vehicle is located in the first area;

determining, by the computing apparatus, whether an object is present in a second area preset at a location of the crosswalk; and determining, by the computing apparatus, a control command to cause a speed of the vehicle to maintain 0 in response to a determination that the object is present the second area, and determining, by the computing apparatus, a control command to cause a speed of the vehicle to be a preset speed in response to a determination that the object is not present the second area.

6. The method of claim 1, wherein:

determining whether the vehicle is located in the preset first area comprises determining, by the computing apparatus, whether the vehicle is located in a first area preset on a first traffic lane entering into an intersection of alleys without a traffic signal and preset at a location spaced apart from an intersection point of the intersection of the alleys by a predetermined distance in a direction opposite to a direction passing through the intersection point;

determining the vehicle control command comprises:

determining, by the computing apparatus, a control command to cause a speed of the vehicle to be lower than or equal to a reference speed when the vehicle is located in the first area;

determining, by the computing apparatus, whether the information can be collected, in real time, from a plurality of second areas set on a plurality of traffic lanes that the vehicle can enter through the intersection and each preset at a location spaced apart by a predetermined distance in a direction opposite to a direction passing through the intersection point; and when the preset travel path is a path that proceeds to one of a plurality of traffic lanes through the intersection of the alleys, determining, by the computing apparatus, a control command to cause a speed of the vehicle to maintain a speed lower than or equal to the reference speed in response to a determination that the information cannot be collected from at least one of the plurality of second areas preset on remaining traffic lanes exclusive of a traffic lane along which the vehicle will travel, and determining, by the computing apparatus, a control command to cause a speed of the vehicle to be a preset speed in response to a determination that the information can be collected from all the plurality of second areas.

7. The method of claim 1, wherein:
determining whether the vehicle is located in the preset first area comprises determining, by the computing apparatus, whether the vehicle is located in a first area preset on a first traffic lane entering into an intersection and preset at a location spaced apart from an intersection point of the intersection by a predetermined distance in a direction opposite to a direction passing through the intersection point;
determining the vehicle control command comprises:
determining, by the computing apparatus, a control command to cause a speed of the vehicle to be 0 when the vehicle is located in the first area;
when the preset travel path is a path that turns left at a driver's own risk at the intersection, determining, by the computing apparatus, whether an object is present in two second areas preset on a second traffic lane along which the vehicle will travel from the intersection according to the preset travel path and a third traffic lane opposite to the second traffic lane and each preset at a location spaced apart from the intersection point by a predetermined distance in a direction opposite to a direction passing through the intersection point, and determining, by the computing apparatus, whether a value obtained by dividing a distance between the object and the vehicle by a moving speed of the object exceeds a reference time; and determining, by the computing apparatus, a control command to cause a speed of the vehicle to maintain 0 in response to a determination that the object is present in any one of the two second areas and the value obtained by dividing the distance between the object and the vehicle by the moving speed of the object is lower than or equal to the reference time, and determining, by the computing apparatus, a control command to cause a speed of the vehicle to be a preset speed in response to a determination that the object is not present in the two second areas or that the object is present in any one of the two second areas but the value obtained by dividing the distance between the object and the vehicle by the moving speed of the object exceeds the reference time.

8. The method of claim 1, wherein determining the vehicle control command comprises, when the second area is not set for the first area, determining, by the computing apparatus, a control command to cause a speed of the vehicle to be lower than a reference speed or a control command to cause a speed of the vehicle to be 0 in response to a determination that the vehicle is located in the first area.

9. An apparatus comprising:
memory configured to store one or more instructions; and
a processor configured to execute the one or more instructions stored in the memory;
wherein the processor performs the method of claim 1 by executing the one or more instructions.

10. A non-transitory computer-readable storage medium having stored thereon a computer program that, when executed by a processor, causes the processor to perform the method of claim 1.

* * * * *